Aug. 23, 1960 E. M. JONES 2,950,470

DIGITAL PATTERN PRODUCING EQUIPMENT

Filed Sept. 15, 1954 3 Sheets-Sheet 1

Inventor
Edward M. Jones
By Alois W. Graf
Attorney

Inventor
Edward M. Jones
By Alois W. Graf
Attorney

Inventor
Edward M. Jones
By Alois W. Graf
attorney

United States Patent Office 2,950,470

Patented Aug. 23, 1960

2,950,470

DIGITAL PATTERN PRODUCING EQUIPMENT

Edward M. Jones, Cincinnati, Ohio, assignor to The Baldwin Piano Company, Cincinnati, Ohio, a corporation of Ohio Filed Sept. 15, 1954, Ser. No. 456,204

12 Claims. (Cl. 340—347)

The present invention relates to a method and apparatus for producing digital patterns, and more particularly to digital pattern producing equipment and systems employing reference discs.

In the applications for Electronic Synchronizing System for Producing Pitch Discs and the Like, Serial No. 135,912, filed December 30, 1949, now Patent No. 2,839,960, and Serial No. 436,831, filed June 15, 1954, now Patent No. 2,924,138, by Edward M. Jones, and assigned to the assignee of this application, there is disclosed a system for producing digital code discs. The production and use of such discs are described in (1) "A High-Precision Analog-to-Digital Converter," by Bernard Lippel, Proceedings of the National Electronic Conference, volume 7, February 1952, pages 206 to 215; (2) "A Digital Code Wheel," by J. Kernahan, Bell Laboratories Record, April 1954, pages 126 to 131; and (3) U.S. Patent 2,590,110 to Lippel, March 25, 1952. Such discs usually comprise a base plate of glass upon which have been photographically produced a series of concentric tracks or patterns, each having alternate opaque and transparent areas, which in the respective tracks correspond to a 0 or 1 in a binary code. Thus for any angular position of the disc when mounted, for example, on a shaft, there is a code representation available. With photoelectric readout equipment disposed in a housing for the disc, the angle of displacement of a shaft may be quantized through a reference aperture in an appropriate radial position. The success which can be met with the use of encoders employing such discs is dependent not only upon the *number of digits* which can be read out, but with the *accuracy* with which the digits can be read. Thus, it is desirable to continue to *improve* the accuracy with which the individual opaque and transparent areas may be disposed on a disc, because there is an increasing demand for such converters to be employed with digital computers for solving quickly problems based upon the analog information available from the shaft or other element from which the information is derived.

In the latter Jones application a system is disclosed in Figure 19 in which a turntable bearing a photosensitive surface which is to be exposed carries about its periphery a reference disc to control the exposure of the photosensitive surface in synchronism with the rotation of the turntable. If in such a system, a single aperture is employed to illuminate the photocell, it is possible that synchronization might be impaired by a particle of dust or foreign matter. It furthermore has been determined that a single aperture is appreciably affected by any inaccuracies in the lines on the reference disc. Accordingly, it is desirable to provide some means for integrating control signals from a reference disc to provide a higher degree of accuracy and obtain reliability unaffected by dust and foreign matter.

In providing reference discs for a digital code producing system, it is desirable to improve the accuracy of the reference disc. In accordance with the teaching of the present invention, a system is provided whereby the desired degree of accuracy of a reference disc may be obtained by following a prescribed process.

It, therefore, is an object of the present invention to provide an arrangement for integrating the control signals from a reference disc in a digital pattern producing equipment.

It is another object of the invention to provide accurate control signals from a reference disc which will be unaffected by dust and foreign matter.

Still another object is to integrate control signals from a reference disc to eliminate the effects of individual inaccuracies therein.

Still another object of the invention is to provide an arrangement for integrating control signals from a reference disc thereby minimizing the degree of accuracy required in the remaining mechanical equipment.

A still further object of the invention is to provide a system for improving the accuracy of reference discs.

Other and further objects of the invention subsequently will become apparent by reference to the following description taken in conjunction with the accompanying drawings, wherein.

Figure 1:
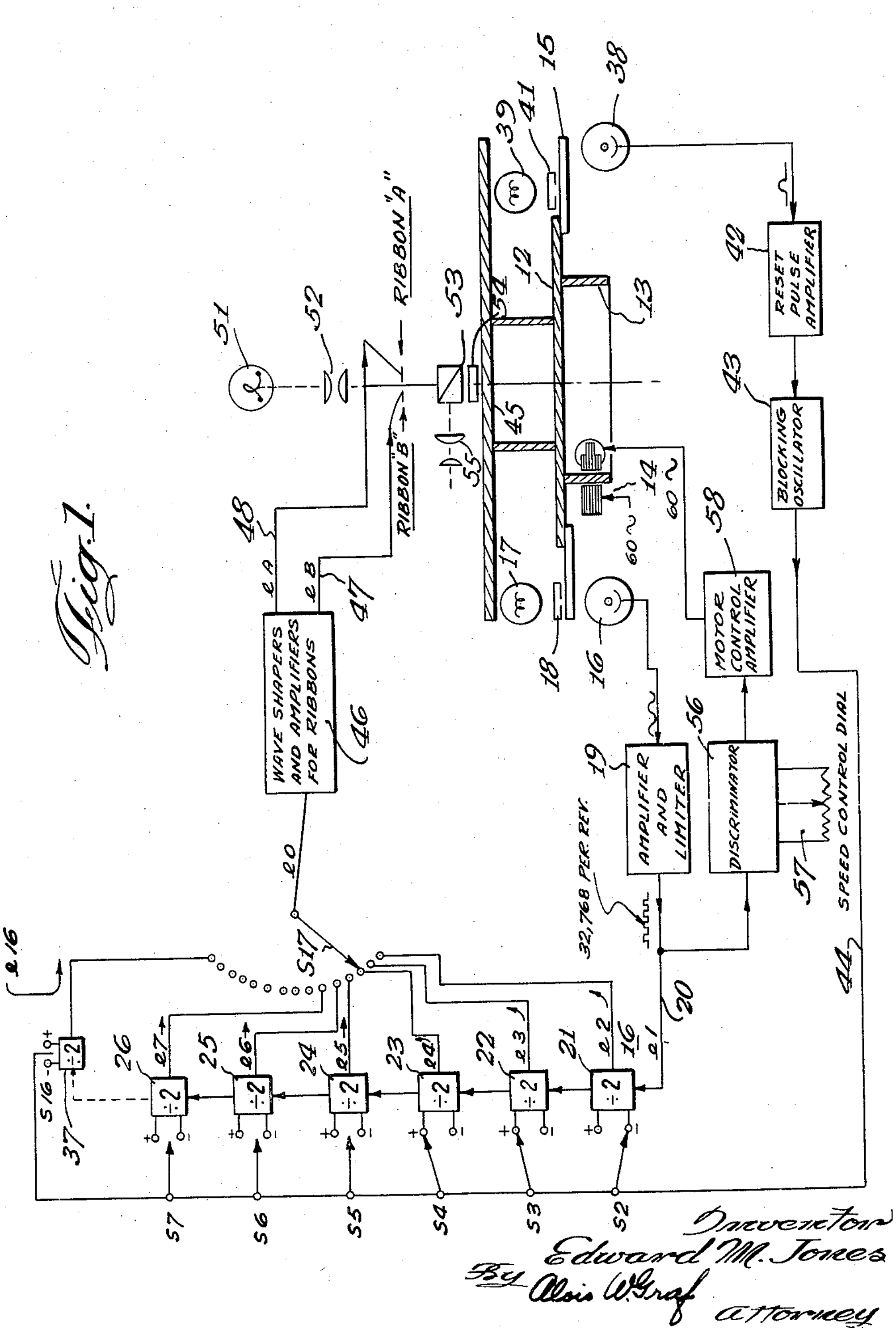
Figure 1 is a schematic representation of a system for producing digital patterns.

Figure 1 is a schematic representation of a system for producing digital patterns similar to that of Figure 19 of the above mentioned Patent No. 2,924,138. A turntable 12 is provided with an aluminum rim 13 which is driven by a two phase alternating current motor 14. The outer edge of the turntable 12 carries an annular plate or member 15, which will henceforth be termed a reference disc since it is provided with the necessary divisions of opaque and transparent surfaces to serve as a reference pattern to control the operation of the system. A photocell 16 is positioned beneath the annular reference plate 15 to receive light from a lamp 17. Light from the lamp 17 also passes through an auxiliary grating 18 which has a plurality of transparent and opaque areas of the same width as the transparent and opaque areas on the reference pattern of the annular member 15. Thus, when the transparent areas of the annular member 15 and the grating 18 are in alignment, light will strike the photocell 16. The photocell 16 supplies a signal to an amplifier and limiter 19 which produces a constant amplitude square wave capable of controlling the operation of a series of flip-flop circuits or dividers 21, 22, 23, 24, 25, 26, 27, 28, 29, 30, 31, 32, 33, 34, 35, 36, 37, as will be hereinafter apparent. By means of a photocell 38, a signal is produced by light passing from a lamp 39 through an auxiliary slit 41. This signal is supplied to a reset pulse amplifier 42 which controls a blocking oscillator 43.

The lamp 39 and photocell 38 produce one pulse during each revolution of the turntable 12 since the track with which the photocell is aligned has but a single radial slit. The pulse from the blocking oscillator 43 is transmitted by a conductor 44 to a series of switches S2 to S16, referred to as reset switches. The switches S2, etc. are thrown in accordance with the particular pattern that is to be produced on the code disc to be formed on a photosensitive plate 45 carried by the turntable 12, as will be apparent from the illustration hereinafter. The various flip-flop circuits are selected by a switch S17 to supply energy to a wave shaper and amplifier 46. The reset switches S2 to 16 and the selector switch S17 are manually operated. The wave shaper and amplifier supplies energy to two conductors 47 and 48, which are connected to a light interrupter or ribbon modulator which includes ribbons A and B. The ribbons A and B serve to modulate light in a path from a light source 51 which passes through a lens 52 to the ribbons A and B, and then to a beam splitting prism 53 from whence light goes to a set of lenses 54 and impinges upon the photosensitive surface 45. The beam splitting prism 53 is provided with another set of lenses 55 which are located adjacent an eye piece for inspection of the image produced in order to set up the proper operation of the apparatus.

A portion of the output of the amplifier and limiter 19 is supplied to a discriminator 56 provided with a speed control 57 to supply energy to a motor control amplifier 58 which energizes the two phase alternating current motor 14.

The modulator illustrated in Figure 1, having the ribbons A and B, consists of a permanent magnet structure provided with two ribbons of Duralumin stretched tightly parallel to each other in an air gap so that they move laterally together or apart when current is passed through them. Each ribbon can be deflected by .0005 inch for any cycle without damage at a velocity of about 25 inches per second. These ribbons have an advantage over other modulators in that they can form the actual slit that is imaged on the photographic plate by the microscopic lens. Further, by having the ribbons move during each transition at a speed corresponding to the circumferential speed of the photographic plate, one of the ribbons can be arranged to instantaneously be stationary with respect to the plate, thus producing a very sharp image even though the slit becomes considerably wider than could be tolerated with other modulation systems. This action of the ribbons and the light modulator is disclosed in detail in application Serial No. 436,831, particularly with reference to Figure 20 thereof. Normally the two ribbons just barely cross with no applied current. Initially, a small reverse current is applied to the ribbons to make them overlap slightly. The wave shaper 176 produces a pulse shaped to cause the ribbons to move about at such a rate that the image moves at approximately the same speed as the turntable, which means that one of the ribbons is temporarily stationary with respect to the plate 45. At the end of the exposure period, the other ribbon moves at the same rate as the table to close the gate without blurring of the photographic image. Since the light gate which includes ribbons A and B is a commercially available item, it will not be further described.

The arrangement shown in Figure 1 provides for driving the turntable at an approximately constant speed and photoelectrically provides a signal from the reference pattern on the member 15, which signal is used to synchronize the code generator circuits employing the flip-flop circuits to control the modulation of the light source 51.

In Figure 1, the turntable is rotated at a relatively constant speed, and a synchronizing signal is derived for driving the flip-flop circuits or dividers and associated circuits to modulate the light source in accordance with a reference pattern on the turntable. The reference pattern is a photographic plate permanently fastened to the turntable containing at least one coaxial track with a number of equally spaced divisions equal to the number of quanta in the code it is desired to produce. For binary codes of 15 digits, a circle of 32,768 divisions is provided. From this it is apparent that the reference circle contains a number of patterns equal to some power of two which are required in each of the circles to be produced in a code disc. The obtaining of the correct phase relationship between adjacent circles is difficult. If the flip-flop circuits or dividers 21 to 37 were operated so one were merely synchronized from the other, a different phase relationship would be obtained every time that the equipment is initially energized. By the use of a reset pulse, however, each of the flip-flop circuits is set to the correct starting condition at the beginning of each revolution. This reset pulse is obtained from the photocell 38, the amplifier 42 and the blocking oscillator 43. The blocking oscillator, therefore, is accurately triggered once for each revolution of the turntable. The result is that once every revolution of the turntable each of the flip-flop circuits is set to a condition of either negative or positive output depending upon the position of the associated reset switch S2 to S16, the switch having been previously manually positioned to produce the proper result.

For developing the straight binary code, the reset switches S2 to S16 are all moved to the minus position, so that the first divider 21 is triggered by the initial pulse. For the cyclic code, the inner track is set up in the same manner, but each of the other tracks must be advanced by one-quarter cycle, since this is the distinguishing feature of this code. This is accomplished by throwing the reset switch associated with the divider from which output is taken by the switch S17 and the one associated with the preceding divider to the plus position and leaving all of the other previous switches set to the minus position.

Figure 1 illustrates the switches in position to expose the third least significant track of a fifteen digit code. Switch S17 connects the wave shaper 46 to the output of flip-flop 23, and the reset switches S3 and S4 set flip-flops 22 and 23 for positive output, while reset switch S2 sets flip-flop 21 for negative output. Reset switches S5 through S16 are illustrated in "open" position to make it clear that flip-flops 24 through 37 are not being used in this example.

It is to be noted that the reset pulse obtained from the blocking oscillator 43 occurs at a point in the operation of the flip-flop dividers 21 to 37 where normally no transition takes place in the wave form supplied thereto. The reset pulse must be strong enough to counteract, if necessary, any triggers from previous stages which might initially occur simultaneously or slightly preceding the reset pulse.

If any one of the reset switches S2 to S16 is in the positive position, that is, the position to produce positive output from the flip-flop responsive to a reset pulse, the corresponding flip-flop divider will flip over to or remain at a condition of most positive output whenever the reset pulse comes along. A corresponding opposite effect would be produced if the switches were at the minus position. The reset action is completed once per revolution on the decaying edge of the voltage pulse. Each of the flip-flop dividers is caused to flip or flop on the rising edge of the output wave of the preceding divider. The initial flip-flop circuit 21 is likewise caused to flip or flop on the rising edge of the square wave supplied to it through the conductor 20.

Figures 2, 3, 4:
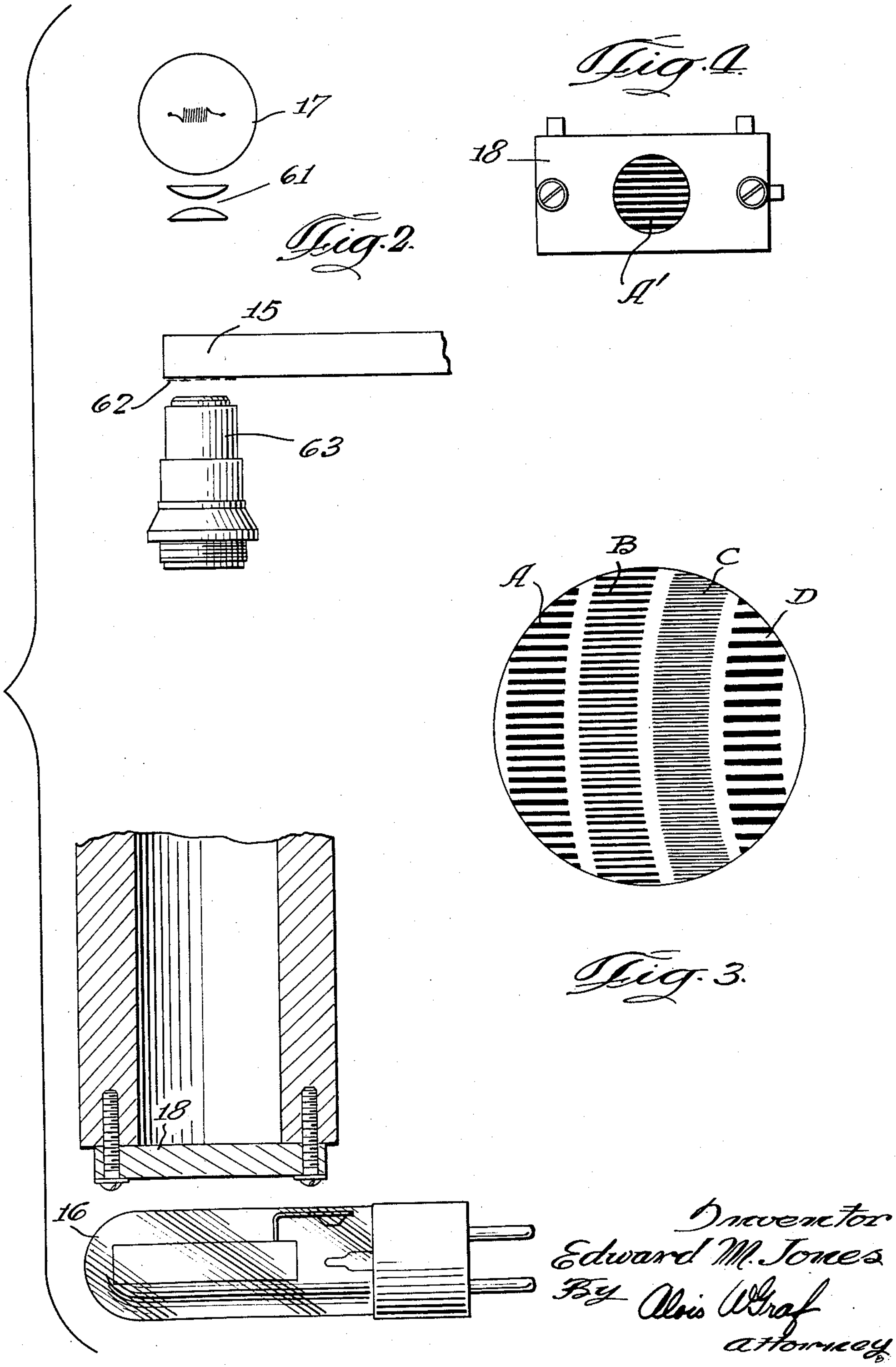
Figure 2 is a partial detailed view of a portion of the mechanism employed in the system of Figure 1.
Figure 3 is an enlarged detailed view of the reference patterns in Figure 2.
Figure 4 is a bottom view of one element shown in Figure 2.

Certain details of the arrangement of the light source 17, the auxiliary pattern 18 and the photocell 16 are illustrated in Figure 2, in accordance with the teachings of the invention. The light source 17 preferably is a lamp in a pre-focused socket which is adjustable in three dimensions. Light from the source 17 passes through a set of condensing lenses 61 to project light through the reference pattern 62 appearing on the underside of the disc member 15. Light passing through the reference pattern enters a microscope objective 63 which in one instance had a magnification of 10×. The magnified image of the pattern on the reference disc 15 passes through the auxiliary pattern 18 and impinges on the photocell 16.

Figure 3 represents a magnified view of the various reference patterns A, B, C and D which are typical of the ones carried by the reference disc 15. The auxiliary pattern or grating carried by the member 18 is denoted by A′ as being complementary to the pattern trace A of Figure 3. The auxiliary pattern or grating is changed whenever a change in operation is desired in accordance with some of the other reference patterns, such as the traces B, C and D. It will be noted that the auxiliary grating shown in Figure 4, which is drawn to a scale smaller than Figure 3, integrates the light from a comparatively large area from the reference disc, which in a particular embodiment was equal to a circle of about 1/16 inch diameter. This was done to eliminate the effect of dust and imperfections. If a single aperture between the various lines in the trace A were used to control the photocell 16, a particle of dust or foreign matter could interrupt the operation of the system. If successive lines or dark spaces in the trace A contained minor imperfections, the use of an integrating auxiliary grating, such as shown in Figure 4, tends to eliminate the effect of such imperfections.

In Figure 3 the arcuate boundaries of the patterns A, B, C and D have been exaggerated so that it will be apparent from the drawing that these patterns are portions of circular patterns. It is further to be noted that the lines in the patterns A, B, C and D in Figure 3 appear substantially parallel, whereas actually they are located on radii of a circle. Since Figure 3 is a magnification of about a 1/16 inch diameter opening in a 15 inch diameter circle, it is apparent that the patterns A, B, C and D are on radii of approximately 60 inches which makes it substantially impractical to attempt to draw each of the lines of the patterns A, B, C and D on the actual radii on the patent drawing.

The entire optical system shown in Figure 2 is movable in a radial direction so that the proper one of the circles A, B, C, and D on the reference disc can be shown. Whenever the optical system is moved to the particular trace, a corresponding change is made in the auxiliary grating made by the member 18. In the particular embodiment employed in one instance, the traces A, B, C, and D had a diameter in the vicinity of 15 inches, so that 32,768 divisions required for a fifteen digit binary code are spaced apart about one and one-half mils. It will be noted that the microscope objective 63 projects a 10 times image of the reference tube onto the auxiliary grating or pattern 18. With the opaque areas equal in width to the transparent areas on both the reference disc and the auxiliary pattern, the signal from the photocell picking up the transmitted light is theoretically a triangular wave, but due to various imperfections approximates a sine wave. Hence, the output of the photocell 16 passes through the amplifier and limiter 19 to produce a square wave suitable for triggering the code generating circuits which employ the various flip-flop circuits. The optical systems described for producing a signal from the reference signal will respond only to the position of the center of each division of the reference pattern and auxiliary pattern, providing that an amplifier and limiter, such as the amplifier 19, is provided to convert the signal from the photocell into a square wave.

Figures 5, 6, 7, 8:
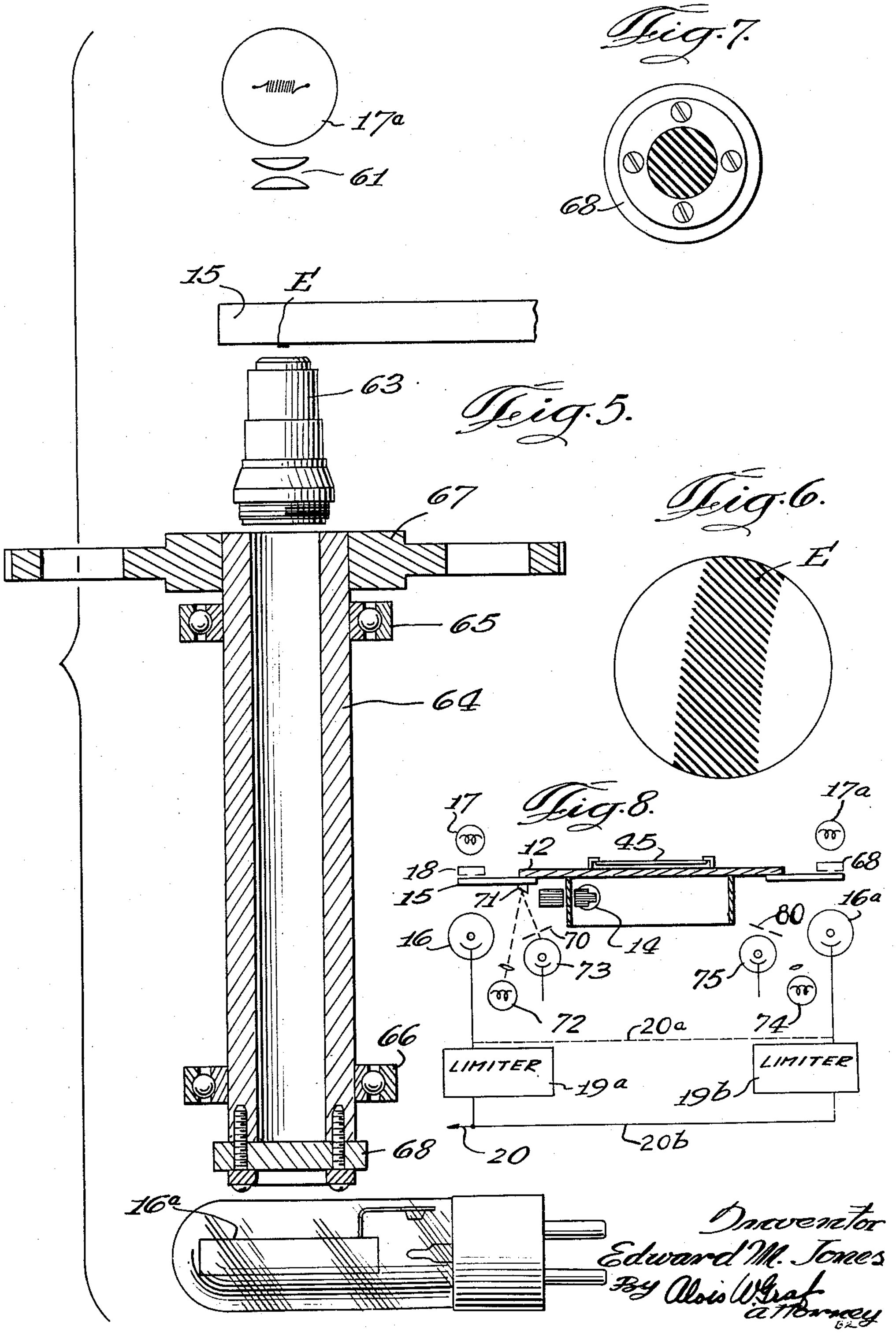
Figure 5 is a detailed view of a portion of the mechanism used to generate sine functions.
Figure 6 is an enlarged detailed view of the reference pattern employed in Figure 5.
Figure 7 is a bottom view of a portion of the mechanism shown in Figure 5.
Figure 8 is a partial schematic representation showing an arrangement employed for improving the accuracy of reference discs.

For the application of the integrating-pattern concept of the invention to the generation of sine function codes, certain modifications are employed in the system shown in Figure 1. The arrangement employed is shown in Figure 5, from which it will be noted that immediately beneath the microscope objective 63 there is a structure comprising a hollow or tubular shaft 64 suitably supported by ball bearings 65 and 66. One end of the shaft 64 carries a gear 67 which is part of a gear train arranged to revolve the shaft 64 in the same direction and relative speed as the turntable. The bottom of the shaft 64 carries an auxiliary grating 68 shown in detail in Figure 7. The auxiliary grating 68 corresponds to the trace E shown in magnified form in Figure 6. The auxiliary grating remains at all times parallel to the lines of the trace E, but as the disc 15 rotates, the lines of the trace E slip over the lines of the auxiliary grating 68. A photocell 16A picking up the light from a source 17*a* passing through the two gratings produces a signal which has an amplitude proportional to the rate of change of sine $\theta$ which is suitable for synchronizing sine function code generating circuits. The gears which drive the gears 67 are arranged to maintain the gratings parallel within $\pm\frac{1}{2}°$ for a reference pattern having 16,384 lines on a 15 inch diameter circle. Slight angular errors in such arrangement reduce the signal strength but do not affect the phase of the signal.

In the generation of sine function codes, a reference pulse must be generated at two positions during each revolution of the turntable 12. Means for generating the two reference pulses is illustrated, in the interest of simplicity and convenience, in Figure 8, in which also is shown an extra signal-generating system for purposes to be described later. For generating the two reference pulses, a reflecting surface 71 is provided for cooperation with a lamp 72, an apertured member 70 and a photocell 73 at one position of the turntable. The reflecting surface 71 also cooperates with another lamp 74, an apertured member 80 and a photocell 75 to provide the other pulse at 180° from the first reference pulse produced. As in the case of photocell 38 of Figure 1, the photocells 73 and 75 of Figure 8 provide reset pulses via reset pulse amplifier and blocking oscillator to the flip-flops for determining the operation of the light modulating ribbons.

For the other purpose about to be described, the reference generator for sine function may have its gear train disengaged, and an additional lamp 17A and cooperating photocell 16A are provided. Referring to Figure 8, the output of the main reference generator photocell 16 and the cooperating photocell 16A may be supplied to separate limiters 19A and 19B, respectively, for producing steep wave front signals and may be combined as in a conductor 20. However, it may be preferable to combine the photocell outputs, as by a connection 20*a* (the connection 20*b* no longer being needed), and pass the combination through a single limiter, such as 19A, for producing steep wave front pulses. In either event, the modified output of the photocells is then used to modulate a light source (not shown) as accomplished in Figure 1, for example. This combination of elements is employed in a method for improving reference circles. If it is assumed that the reference pattern 15 has a high arc accuracy, i.e. ±three seconds, an improved accuracy can be obtained by successively reproducing reference circles on the photosensitive surface 45. Two photocells 16 and 16A receive signals from the first reference circle or disc at separated points, such as 180°. The combined signal from the two photocells is used to modulate the light source to produce the new reference circle. The new reference circle is then used by shifting the photocell 16A and the light 17A to another angle which is half of the previous angle to make a third reference pattern. This process is repeated a number of times with an improvement in the accuracy each time until the desired degree of accuracy has been obtained. This will become apparent from the following discussion.

Assuming the signals from the two photocells 16 and 16A are sinusoidal and of equal amplitude, but phase modulated by an error function $f(\theta)$ and $f(\theta+\phi)$, where $\theta$ is the instantaneous angular position of the reference circle, $m$ is the number of patterns in the reference circle, and $\phi$ is the angular separation of the two photocells, then the combined photocell signal $e$ is:

$$e=E\sin(m\theta+f(\theta))+E\sin(m\theta+f(\theta+\phi))$$

The assumption is also made above that points on the reference circle with equal errors give photocell voltages having the same phase. This requirement is met if the average phase of the signal as the reference circle is revolved is the same for the two photocells. This is easily accomplished by connecting the photocell signals respectively to the vertical and horizontal deflection inputs of a scope and adjusting the auxiliary pattern in conjunction with one of the photocells until the signals appear in phase on the average as the turntable is rotated.

The above equation can be transformed:

$$e=2E\sin\left(m\theta+\frac{f(\theta)+f(\theta+\phi)}{2}\right)\cos\left(\frac{f(\theta)-f(\theta+\phi)}{2}\right)$$

Assuming that $f(\theta)$ is always appreciably less than $\pi/2$, in other words if the error in the reference plate is less than ¼ cycle of the reference pattern (which is true if the error is less than 3 seconds of arc), then by putting the combined photocell signal through a limiter, the cosine term in the above equation is eliminated and the new reference plate has a phase error $$f'(\theta)=\frac{f(\theta)+f(\theta+\phi)}{2}$$

Since the errors repeat once every revolution of the turntable, the error function can be split up into various harmonics:

$$f(\theta)=A_1\sin(\theta+\phi_1)+A_2\sin(2\theta+\phi_2)\ \ldots\ +A_n\sin(n\theta+\phi_n)+\ \ldots$$

$$f'(\theta)=\sum_{n=1}^{n=\infty}A_n\left[\frac{(\sin n\theta+\phi_n)+\sin(n\theta+n\phi+\phi_n)}{2}\right]$$

$$=\sum_{n=1}^{n=\infty}A_n\cos\tfrac{1}{2}n\phi\sin(n\theta+\tfrac{1}{2}n\phi+\phi_n)$$

Thus, the strength of a harmonic of the error function in the new reference circle compared to the harmonic in the old reference circle is:

$$\frac{A'_n}{A_n}=\cos\frac{n\phi}{2}$$

By first making a new reference plate using $\phi=180°$, harmonics with $n=1, 3, 5, 7, 9$ . . . are cancelled out, and harmonics with $n=2, 4, 6, 8, 10$ . . . remain unattenuated.

Then using this reference plate to make another reference plate using $\phi=90°$, harmonics with $n=2, 6, 10, 14$ . . . are cancelled out, and harmonics with $n=4, 8, 12, 16$ . . . remain.

Using this reference plate to make another reference plate using $\phi=45°$, only the harmonics with $n=8, 16, 24$ . . . remain.

By going through the process with $\phi=22\frac{1}{2}°$ and again with $\phi=11\frac{1}{4}°$, no harmonics below the 32nd remain, etc.

Actually multiplying these values of $\phi$ by any odd number will give the same results, so it is never necessary to bring the photocell units extremely close together. Therefore providing photocell spacings of 180°, 90°, 22½° to 45° will permit carrying out this error cancellation process as far as desired.

Thus the reference pattern may be made with such accuracy that the only errors occurring in the operation of a system are those mechanical errors as the support and bearing accuracies of the turntable or other inaccuracies which might occur in the operation of the code generating circuits. Photographic irregularities which may change the width or density of the divisions will not affect the position of the center of each division. Accordingly, the optical systems heretofore described for obtaining the control signals will respond only to the positions of the centers of the divisions providing the proper amplifier and limiter is used to convert the more or less sinusoidal signal from the photocell into a square wave or a wave having a steep wave front.

While for the purpose of illustrating and describing the present invention certain preferred embodiments have been shown in the accompanying drawings, it is to be understood that the invention is not to be limited thereby since such variations and additions are contemplated as may be commensurate with the spirit and scope of the invention set forth in the accompanying claims.

I claim as my invention:

1. In a digital pattern producing equipment, the combination of a turntable provided with a peripheral reference pattern comprising alternate equal transparent and opaque areas, a source of light confronting and focused upon said reference pattern, a photocell mounted on the side of said reference pattern opposite the light source, an enlarging optical system mounted in alignment with the photocell and reference pattern to transmit light passing through said reference pattern toward said photocell, and an auxiliary pattern of equal transparent and opaque areas interposed between said photocell and said optical system to integrate light passing through a predetermined area of said reference pattern, said auxiliary pattern being an image of a portion of the reference pattern enlarged by a factor equal to the magnification of the optical system.

2. A device for producing code discs comprising a turntable carrying a peripheral reference pattern composed of small alternate transparent and opaque areas, a photosensitive surface carried by said turntable, a light source focused upon said photosensitive surface, and means for modulating said light source including a shutter positioned between the light source and the turntable, a plurality of spaced apart sources of light directed toward said reference pattern, a plurality of photoelectric devices for receiving the light from said latter sources passing through said reference pattern, means connected to the photoelectric devices for producing a control signal having a steep wave front, and means coupled to the shutter for combining said control signals to control said shutter.

3. A device for producing code discs comprising, in combination, a turntable having a peripheral pattern composed of alternate transparent and opaque areas, a photosensitive surface carried by said turntable, a light source focused upon said photosensitive surface, and means for modulating said light source including a shutter positioned between the light source and the turntable, a plurality of spaced apart sources of light directed toward said reference pattern, means for changing the angular relation between said plurality of light sources, a plurality of photoelectric devices for receiving the light from said latter sources passing through said reference pattern, means mounted between the reference pattern and each photoelectric device for integrating the light passing through the confronting portion of said reference pattern and said photoelectric device, means connected to each photoelectric device for producing a control signal having a steep wave front, and means connected to the shutter for combining said control signals to control said shutter.

4. A device for producing digital code discs comprising, in combination, a plurality of flip-flop circuits connected in cascade, each of said circuits having a first and a second phase control input, said flip-flops assuming a first phase responsive to a pulse on the first phase control input and a second phase responsive to a pulse on the second phase control input, a turntable provided adjacent its periphery with a reference track of alternate transparent and opaque sectors, a source of light focused on said reference track, a photocell mounted on the side of said reference track opposite the light source, an auxiliary pattern of transparent and opaque areas disposed between said reference track and said photocell to integrate the light passing through a plurality of transparent areas, means for controlling said code generating circuits from said photocell, a first electro-optical pulse generating means associated with a first position of said turntable and connected to the first phase control input of each flip-flop and a second electro-optical pulse generating means associated with a second position of said turntable and connected to a phase control input of each flip-flop.

5. A device for producing code discs comprising a turntable having a peripheral reference pattern composed of alternate transparent and opaque areas, a photosensitive surface carried by said table, a first light source focused upon said photosensitive surface, means for modulating said light source including a shutter positioned between the first light source and the disc, a plurality of spaced apart sources of light mounted adjacent to a side of said peripheral reference pattern, a plurality of photoelectric devices, each photoelectric device being mounted on the side of the reference pattern opposite one of the light sources for receiving light from said latter sources passing through said reference pattern, and means electrically connected to each of said photoelectric devices and the shutter for producing a combined control signal.

6. A device for producing code discs comprising the elements of claim 5 in combination with means connected between the photoelectric devices and the shutter for limiting the control signal to provide a steep wave front for actuation of the shutter.

7. The method of producing a code disc having a circular track of alternate opaque and transparent sectors from a master of greater accuracy than the master comprising photoelectrically generating two signals from two different points on the master, combining said signals, modulating a light source with said combined signals, and photographically producing a second master code disc with said modulated light source; photoelectrically generating from said second master disc two electrical signals from points separated by half the previous angle therebetween, combining said signals, and photographically producing a third master disc in accordance with said combined signals; photoelectrically generating from said third master disc two electrical signals from points separated by half of the previous angle, combining said signals, and photographically producing a fourth master disc in accordance with said combined signals; photoelectrically generating from said fourth master disc two electrical signals from points separated by half the previous angle, combining said signals, and photographically producing a fifth master disc in accordance with said combined signals; and photoelectrically generating from said fifth master disc two electrical signals from points separated by half the previous angle, combining said signals and photographically producing a sixth master disc in accordance with said combined signals.

8. The method of improving the accuracy of reference discs comprising deriving from one reference disc two electrical signals from points 180° apart on said disc, combining said signals and modulating a light source therewith, photographically producing a new reference disc with said modulated light source; thereafter repeating the foregoing steps by deriving from the newer reference disc two signals from points $\phi/2$ where $\phi$ is the angle between the points in the previous series of steps; and continuing similar repetitions of said series of steps until $\phi/2$ is equal to 22.50°.

9. The method of improving the accuracy of reference discs comprising deriving from one reference disc two electric signals from two points separated by an angle $\theta$, limiting and combining said signals, modulating a light source therewith to produce photographically a new reference disc; thereafter repeating the previous steps by deriving from the new reference disc two signals from points separated by half the previous angle $\theta$ to produce photographically a newer reference disc; and repeating the latter series of steps until the desired accuracy has been obtained in the most recent photographically produced disc.

10. The method of improving the accuracy of a periodic pattern comprising deriving from said pattern two signals from different points adjacent thereto, combining said signals and employing the combination to produce a new pattern on a member moving with said first pattern.

11. The method of improving the accuracy of a circular pattern comprising deriving from said pattern two signals from different points adjacent to said pattern, combining and modifying said signals so as to produce steep wave front pulses, modulating a light source with said pulses and photographically producing a second similar pattern on a member revolving with said first pattern.

12. The method of improving the accuracy of reference discs comprising deriving from a reference disc two signals from separated points on the disc, combining said signals, modulating a light source with said combined signals and photographically producing a second reference disc with said modulated light; deriving from said second reference disc two signals from points separated by half the distance of the separation of points on said first disc, and combining said latter signals and photographically producing a third reference disc in accordance with said latter signals.

References Cited in the file of this patent

UNITED STATES PATENTS

| | | |
|---|---|---|
| 1,863,363 | Zworykin | June 14, 1932 |
| 2,107,752 | Harley | Feb. 8, 1938 |
| 2,142,573 | Miller | Jan. 3, 1939 |
| 2,186,203 | Centano | Jan. 9, 1940 |
| 2,247,805 | Faus | July 1, 1941 |
| 2,590,110 | Lippel | Mar. 25, 1952 |